July 12, 1955  R. C. PEMBERTON  2,712,862
BRAKE CABLE LUBRICATOR
Filed Feb. 4, 1950

INVENTOR.
Robert C. Pemberton.
BY
ATTORNEY.

United States Patent Office 2,712,862
Patented July 12, 1955

2,712,862
BRAKE CABLE LUBRICATOR

Robert C. Pemberton, Lansing, Mich.

Application February 4, 1950, Serial No. 142,429

3 Claims. (Cl. 188—205)

This invention relates to apparatus for lubricating brake cable mechanism, particularly emergency brake cables to eliminate sticking thereof due to rust or other causes.

In certain makes of automobiles, the so called emergency or parking brake system consists of a lever operated by hand or foot, the force from which is transmitted to the rear service brakes by means of a flexible cable connecting the lever to the service brake shoes. No provision is made for lubricating the cable nor for eliminating the entrance of moisture between the cable proper and its flexible sheath. The parts eventually become sufficiently dirty and rusted that the cable may "freeze" to the sheath, preventing proper operation of the emergency brake when needed.

The present invention is designed to eliminate the possibility of such "freezing" by providing a means for introducing lubricant into the space between the cable and sheath, and preventing leakage of the lubricant and the entrance of moisture.

Briefly, the invention comprises a special type of lubricant fitting firmly attached to the brake end of the cable sheath and through which the cable slides. The fitting is provided with a lubricant receiving chamber and a lubricant nipple through which lubricant can be introduced at high pressure.

In the drawings accompanying the application—

Figure 1:
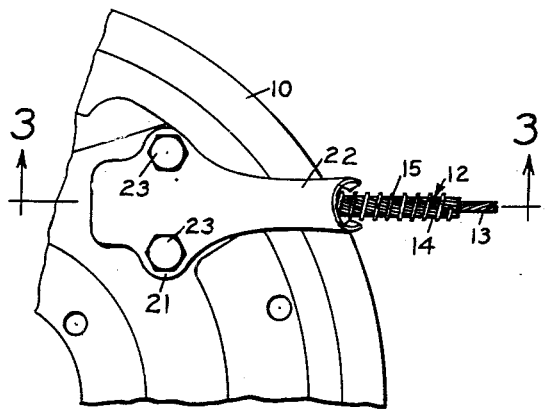
Figure 1 is a fragmentary elevational view of the outside of a brake backing plate with the invention applied thereto.

Referring now to the drawings in more detail, the various figures show a portion of a brake backing plate 10 of conventional construction. The brake backing plate supports a pair of brake shoes which may be either mechanically or hydraulically actuated in the conventional manner. The brake shoes have been omitted from the drawing, as they are conventional and would tend to obscure the invention.

Figure 2:
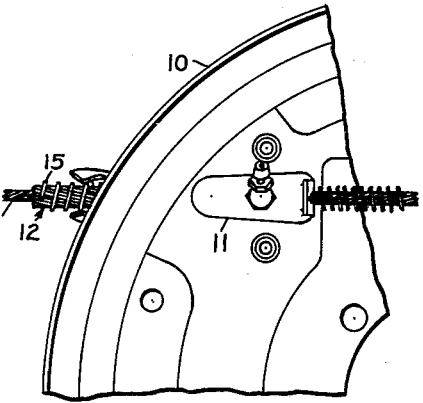
Figure 2 is a similar fragmentary elevational view taken from the inside of the brake backing plate.
Figure 4:
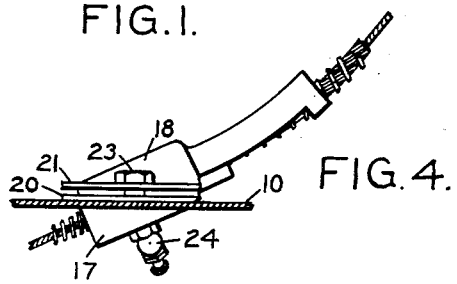
Figure 4 is a fragmentary cross-sectional view of Figure 1.

The brake backing plate 10 has an opening 11 therethrough (see Figures 2 and 3) through which an emergency brake operating cable mechanism 12 extends. The cable mechanism consists of a steel cable 13 enclosed within a flexible sheath 14. The cable 13 is connected at one end to the brake operating lever (not shown) and at the other end to a conventional brake shoe actuating mechanism (not shown). The cable sheath 14 is wrapped with a helical wire 15 for a portion of its length.

Figure 3:
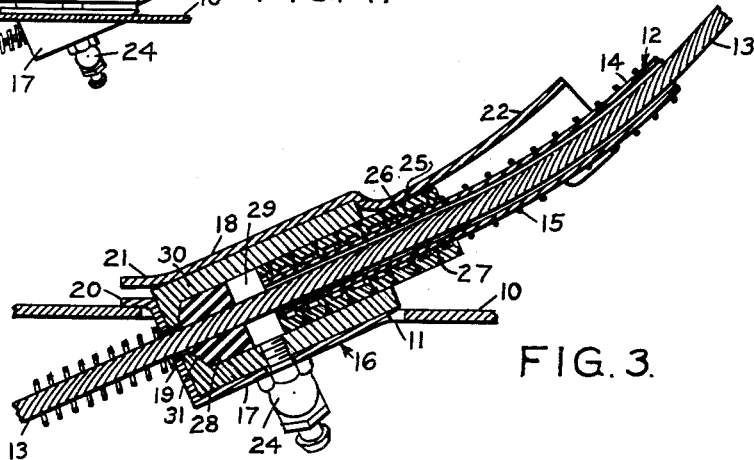
Figure 3 is a fragmentary cross-sectional view taken on substantially the line 3—3 of Figure 1.

Heretofore the brake cable mechanism has been supported by a bracket mounted adjacent the opening 11. That bracket is replaced by another bracket 16 which constitutes a part of the present invention. The bracket 16 is composed of two sections 17 and 18 which may be metal stampings. Each section 17 and 18 has a semi-cylindrical tubular portion with flanges 20 and 21 on certain edges thereof. The section 17 is provided with a flange 20 surrounding three of its sides. Section 18 has a similar flange 21. The flange 21 is extended at 22 and rolled into a circular shape to partially surround and support the brake cable sheath 14 as shown in Figures 1 and 3. The flanges 20 and 21 are provided with holes to receive the machine screws 23 by means of which the bracket 16 is attached to the brake backing plate.

Located within the semi-cylindrical portions of the two sections of bracket 16 is a tubular sleeve 30. The sleeve 30 is formed of steel. It is of cylindrical exterior configuration. It is also of cylindrical configuration interiorly thereof from the right hand end (as viewed in Figure 3) to a point near its left hand end. There it tapers down to form a conical shoulder 31 terminating in an opening 19 slightly larger than the cable 13.

The sleeve 30 is also provided with a standard grease nipple 24 threaded into its side intermediate the ends thereof.

As will be noted in Figure 3, the sheath 14 extends into the space within the sleeve 30 nearly to the grease nipple 24. A packing gland 25 in the form of a split tube surrounds the sheath 14. The gland 25 is provided with a helical groove 26 interiorly thereof to receive wire 15, while the exterior is provided with a second very shallow helical groove into which a heavy cord, preferably nylon cord 27, is wound. The cord 27 is of slightly greater diameter than the depth of the groove. The gland 25 is clamped tightly between the sheath 14 and sleeve 30 preferably by swaging or crimping the surrounding wall of the sleeve against the packing gland. This tightly holds the cable mechanism in place. Cord 27 forms a tight seal between the exterior of the gland and the sleeve 30.

Another packing gland 28 is placed between the brake cable 13 and the sleeve 30 at the other end of the latter. This packing gland is preferably a ring formed from synthetic rubber or other deformable, substantially incompressible material which is not affected by petroleum lubricants. It terminates short of the grease nipple 24 so as to provide a lubricant chamber 29 between the two glands. It is provided, preferably with a conical end, to fit the conical portion of the sleeve while the other end is flat.

The sleeve 30 is securely held in the bracket 16 by tightening the screws 23 after the sleeve has been located within the two sections 17 and 18.

To lubricate the brake cable it is necessary, in the form of the invention shown, to remove the wheel and brake drum to obtain access to the grease nipple 24. However, as the cable need be lubricated but once or twice a year that is not important. The nipple could be put outside of the backing plate, but it is not protected there.

Grease is forced from a high pressure lubricating gun through the nipple 24 into the chamber 29. From there it is forced between the brake cable 13 and the sheath 14 to lubricate the cable. The pressure of the lubricant deforms the gland 28 and forces it into a tight seal with the brake cable 13, thereby preventing leakage at that point. After the pressure from the lubricating gun is released, the gland 28 resumes its normal shape, thereby permitting the cable to move freely through it.

From the foregoing it will be seen that the present invention provides a simple and practical device for lubricating a brake cable. It also forms a sturdy support for the brake cable mechanism on the brake backing plate.

The scope of the invention is indicated in the appended claims.

I claim:

1. The combination with a brake backing plate having an opening therethrough, of an angularly disposed, substantially cylindrical lubricating and guide bracket comprising diagonally separable inner and outer sections bolted in position partially within said opening, a hand brake actuating cable extending through said bracket from end to end thereof, a sheath on the outer end portion of said cable terminating within said bracket, the inner section of said bracket having an inner end wall with an opening therein for the passage of said cable, and having an elongated, integral, semi-cylindrical extension curving outwardly relative to said backing plate to guide said cable, a tubular, hard metal sleeve in said bracket receiving one end of said sheath and having an inner end wall, the bore of said sleeve terminating in a conical seat adjacent the end wall of said sleeve, the end wall of said sleeve having a reduced opening relative to the bore of said sleeve for passage of said cable therethrough of greater diameter than said cable to define a clearance therearound, a packing gland encircling the end of said sheath and in fluid-tight engagement with said sleeve and sheath, an incompressible, deformable rubber gland spaced from said first-mentioned gland and shaped to form a lubricant chamber therebetween, said gland being formed with a conical end wall disposed in the inner end of the bore of said sleeve opposite said first-mentioned gland and wedging into said clearance to grip and immobilize said cable and seal off the inner portion thereof when grease under high pressure is forced into said chamber, and a grease nipple mounted on the wall of said inner bracket section within said backing plate and extending through said inner section and said sleeve to communicate with said chamber and permit grease, under pressure, to be forced thereinto.

2. The combination with a brake backing plate having an opening therethrough, of a substantially cylindrical lubricating and guide bracket bolted in position partially within said opening, a hand brake actuating cable extending through said bracket from end to end thereof, a sheath on the outer end portion of said cable terminating within said bracket, said bracket having an inner end wall with an opening of sufficient diameter therein to permit the free passage of said cable, a tubular hard metal sleeve in said bracket receiving one end of said sheath and having an inner end wall, the bore of said sleeve terminating in a conical seat adjacent the end wall of said sleeve, the end wall of said sleeve having a reduced opening relative to the bore of said sleeve for passage of said cable therethrough of greater diameter than said cable to define a clearance therearound, a packing gland encircling the end of said sheath and in fluid-tight engagement with said sleeve and sheath, a substantially incompressible, deformable, resilient rubber gland in said sleeve spaced from said first-mentioned gland and sheath to form a lubricant chamber therebetween and having a central bore for the passage of said cable, said gland being formed with a conical end wall disposed in the inner end of the bore of said sleeve opposite said first-mentioned gland and wedging into said clearance to grip and immobilize said cable and seal off the inner portion thereof when grease under high pressure is forced into said chamber, and a grease nipple mounted on the wall of said bracket within said backing plate extending through said sleeve to communicate with said chamber and permit grease under pressure to be forced thereinto.

3. The combination with a brake backing plate having an opening therethrough, of a substantially cylindrical lubricating and guide bracket bolted in position partially within said opening, a hand brake actuating cable extending through said bracket from end to end thereof, a sheath on the outer end portion of said cable terminating within said bracket, said bracket having an inner end wall with an opening of sufficient diameter therein to permit the free passage of said cable, a tubular, hard metal sleeve in said bracket receiving one end of said sheath and having an inner end wall, the bore of said sleeve terminating in a conical seat adjacent the end wall of said sleeve, the end wall of said sleeve having a reduced opening relative to the bore of said sleeve for passage of said cable of greater diameter than said cable to define a clearance therearound, a tubular, split packing gland encircling the end of said sheath and in fluid-tight engagement with said sleeve and sheath, a helical wire on said sheath, said gland being formed with a helical groove on the inner surface thereof accommodating said wire and with a helical groove on the outer surface thereof, a cord of slightly greater diameter than said groove being wound in the groove on the outer surface thereof, an incompressible, deformable, resilient rubber gland in said sleeve spaced from said first-mentioned gland and sheath to form a lubricant chamber therebetween, and having a central opening for the passage of said cable, said gland being formed with a conical end wall disposed in the inner end of the bore of said sleeve opposite said first-mentioned gland and wedging into said clearance to grip and immobilize said cable and seal off the inner portion thereof when grease under high pressure is forced into said chamber, and a grease nipple mounted on the wall of said inner bracket section within said backing plate and extending through said sleeve to communicate with said chamber and permit grease under pressure to be forced thereinto.

References Cited in the file of this patent

UNITED STATES PATENTS

| | | |
|---|---|---|
| 1,589,108 | Caretta | June 12, 1926 |
| 1,861,714 | Norviel | June 7, 1932 |
| 2,144,025 | La Brie | Jan. 17, 1939 |
| 2,187,037 | Kirkpatrick | Jan. 16, 1940 |
| 2,201,426 | Bratz | May 21, 1940 |

FOREIGN PATENTS

| | | |
|---|---|---|
| 746,071 | France | Feb. 12, 1932 |
| 346,953 | Great Britain | Apr. 23, 1931 |